Sept. 10, 1929.  T. FERRY  1,727,590

CAP NUT

Filed Sept. 16, 1926

Inventor
Thomas Ferry
By Evans & McCoy
Attorney

Patented Sept. 10, 1929.

1,727,590

UNITED STATES PATENT OFFICE.

THOMAS FERRY, OF CLEVELAND, OHIO.

CAP NUT.

Application filed September 16, 1926. Serial No. 135,843.

My invention relates to improvements in fastening devices, such as bolts, nuts and the like.

It is an object of my invention to provide a bolt head or a nut which may be made of steel or other material of strength or stability, and which may be easily covered with a suitable non-corrosive ornamental covering which makes the nut or bolt head rust proof, and which covering can be plated, burnished or polished as desired, to produce the desired ornamental effect.

It is also an object of my invention to provide such covering which can be readily applied to standard bolt heads and nuts without the use of the inclined sides as disclosed in my Patent No. 1,450,483 granted April 3rd, 1923, and to which the ornamental covering is rigidly secured.

These and other objects will be apparent from the following description and annexed drawings.

Figure 1:
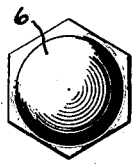
Figure 1 is a top view showing the head of a bolt or nut provided with an ornamental covering.
Figure 2:
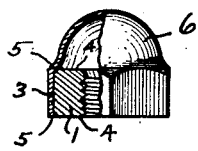
Fig. 2 is a side elevation partly in section showing a nut provided with the covering.
Figure 3:
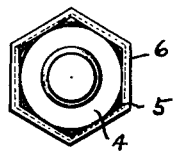
Fig. 3 is a bottom view of the nut and covering.
Figure 4:
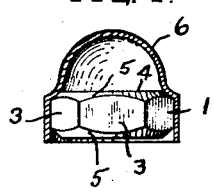
Fig. 4 is a side elevation with the covering in section before the free end of the cover has been upset.
Figure 5:
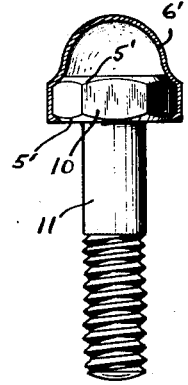
Fig. 5 is a view of the bolt head provided with a cover.

In describing my construction, a hexagonal or polygonal nut 1 which is shown in Fig. 2 is threaded entirely through its thickness and is provided with sides 3 which are substantially parallel to the axis of the nut. In order to tightly apply the cover cap to the nut to hold the same against relative movement with respect to the cap, a portion of the metal of the nut at or adjacent the corners formed by the intersection of sides 3 and the faces 4 of the nut is removed. This metal may be removed in any desired manner as by cutting down the corners or forming grooves or recesses therein. That is, the corners may be turned down to form a beveled edge as shown at 5 in Fig. 4, or grooves or recesses 5ª may be cut at the corners in many ways, one example being shown in Fig. 6. The cap or covering 6 comprises an ornamental head portion and a base portion which is pressed into close conformity with the angular sides 3 of the nut 1 and with the beveled portion 5 thereof. At the outer corners 5 of the nut, that is the corners remote from the cover 6 when it is applied to the nut, the free edge of the cover metal is riveted over so that the edge of the ornamental head is actually upset to overlie and substantially fill the beveled corner or recessed portion of the nut. Any rough or ragged edges of the cover metal may be readily trimmed, so that the outer face 4 of the nut and the free edge of the ornamental cap are entirely flush.

Similarly, the cover 6' may be applied to the head 10 of the bolt 11, the head having its corners beveled as shown at 5' or otherwise recessed to receive the metal of the cover so that the cover may be rigidly pressed tightly against the sides of the bolt head and the two may be held together against relative movement axially or transversely of the bolt.

Figure 6:
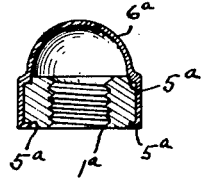
Fig. 6 shows a modified form of covering a nut.

In Fig. 6 a nut 1ª is provided with recesses 5ª at the corners to receive the metal of the cover 6ª so that the cover, when applied to the nut, will readily hold the same against relative movement axially or transversely.

It is obvious that the cover may be fastened to the nut by simply removing a portion of the metal from the corners of the nut at the outer face of the nut or from a portion of the nut adjacent the corners and pressing or upsetting the metal of the cover into a recess or portion of the nut from which the metal has been removed. It is preferred, however, to remove metal from the corners of the nut adjacent both faces of the nut so that the cover may be pressed into more intimate engagement with the nut at the corners thereof adjacent the inner face of the nut and thus more securely lock the cover and nut together as well as provide a better appearance. By cutting the metal away from the corners of the nut it not only makes a stronger attachment between the cover and the nut, but the nuts are reversible so that in the application of the covers to the nuts the covers may be applied to the nuts without regard to the face of the nut that is adjacent the body portion of the cover.

It will also be apparent that the bolt heads may have portions of the metal removed at the corners in various ways as in the case of the nuts, and the cover may be pressed tightly in engagement with the sides of the head which are parallel to the axis of the head and the metal be shaped to conform to the shape of the corners of the bolt head.

By this construction it will be obvious that the nut or bolt head is securely held against relative movement in the cover axially of the cover, or transversely thereof, and the ornamental head may be pressed and applied to the nut in a relatively simple and inexpensive manner.

Furthermore, it is to be understood that the particular procedure set forth is presented for purposes of explanation and illustration and that various modifications of said procedure can be made without departing from my invention as defined in the appended claims.

What I claim is:

1. A fastening device comprising a terminal member having flat peripheral sides and having its inner and outer faces provided with depressed marginal edges, and a cupped substantially rigid sheet metal cap having an enlarged open end formed to receive the terminal member and closely fitting upon the peripheral sides thereof, said cap having an internal shoulder fitting the depressed marginal edge of the outer face of said member, the edge of the cap being upset into the depressed marginal edge of the inner face of the terminal member flush with the inner face of the terminal member the terminal member and cap forming a substantially unitary body.

2. A fastener including a metallic nut having angularly disposed sides to receive a wrench, and a substantially rigid cap member tightly engaging said sides and forming a hollow terminal head, said nut having portions thereof removed adjacent its faces and said cap member being pressed into tight engagement therewith to form a substantially unitary structure.

3. A fastener including a metallic terminal member having angularly disposed sides and substantially parallel faces, and having a portion of the metal at the juncture of the sides and faces of the terminal member removed, and a substantially rigid cover cap forming a hollow terminal head and provided with similarly shaped sides to conform to the angular sides of the terminal member, said cover member being forced into engagement with the portions of the terminal member from which metal has been removed, whereby the cover member is made substantially unitary with said terminal member and is rigidly held against relative movement thereto.

In testimony whereof I affix my signature.

THOMAS FERRY.